Figure 1:
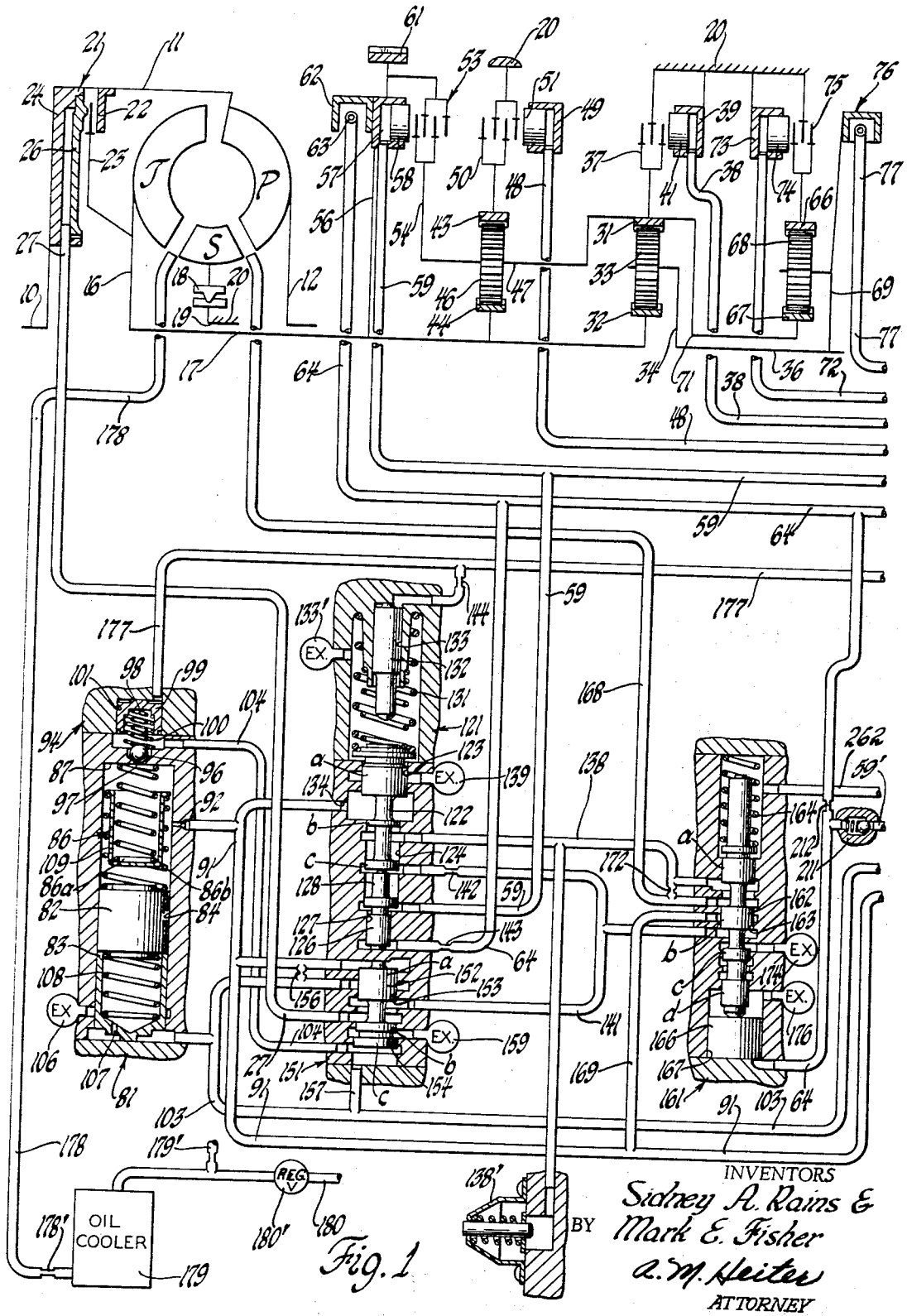

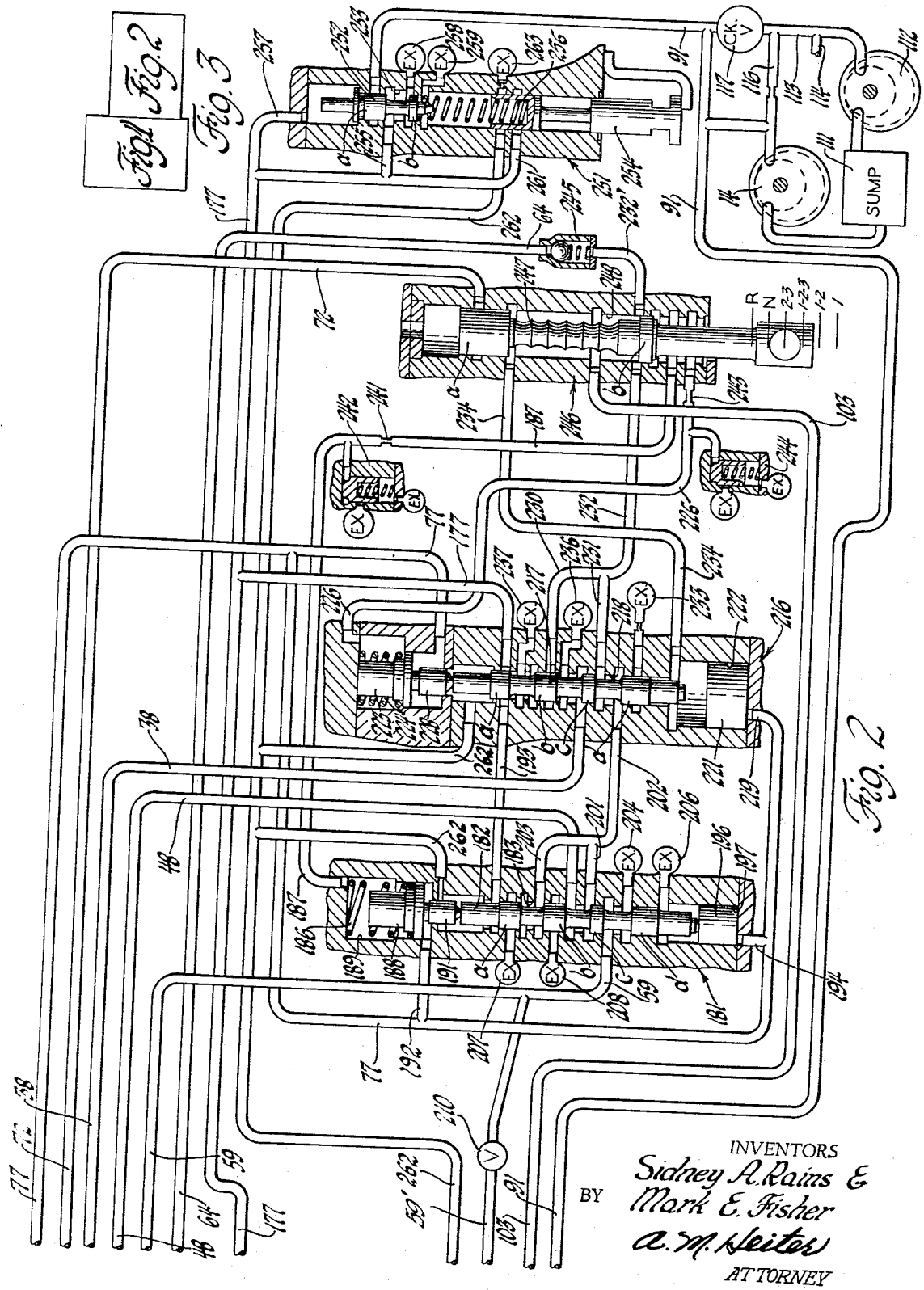

3,330,170
TRANSMISSION
Sidney A. Rains, Speedway, and Mark E. Fisher, Carmel, Ind., assignors to General Motors Corporation, Detroit, Mich., a corporation of Delaware
Filed May 20, 1964, Ser. No. 368,782
15 Claims. (Cl. 74—752)

This invention relates to transmissions and more particularly to automatic transmission control systems.

In transmissions having a torque converter, a lockup clutch for the torque converter and a three-speed gear unit, this control system provides automatic operation in a plurality of ranges, one providing automatic operation in all forward ratios and others providing automatic operation in the two highest, the two lowest and the lowest ratio. The control system also provides automatic lockup clutch operation in the first gear ratio and may provide for disabling automatic clutch operation in the intermediate and high ratios. The controls also provide for hysteresis action on the shift valve by providing a hysteresis force which occurs during the initial portion of movement of the valve in an upshift direction and also during the initial portion of movement of the valve in a downshift direction.

The object of the invention is to provide an improved automatic transmission control system.

Another object of the invention is to provide in a three ratio transmission control system selectively providing automatic operation in three ratios, the upper two ratios, the lower two ratios and the lowest ratio.

Another object of the invention is to provide in a transmission having a torque converter lockup clutch and multiratio gear unit, a speed responsive control for automatically engaging the lockup clutch in one or more ratios which may be disabled in another ratio of the gear unit.

Another object of the invention is to provide a shift valve hysteresis control providing a change in the hysteresis force at the initial portion of upshift movement and at the initial portion of downshift movement.

These and other objects of the invention will be more apparent from the following drawing and specification showing a preferred embodiment of the invention.

FIGURES 1 and 2, when arranged as shown in FIGURE 3, diagrammatically show the transmission and control system.

The transmission shown in the drawing illustrates the invention. The power train has a torque converter and ratio gearing. The input shaft 10 drives the torque converter housing 11 having a pump P and a hub 12 which may be connected by gearing to drive the input pump 14. The pump P circulates fluid through the torque converter chamber to drive the turbine T, which is connected by a hub 16 so the torque converter turbine drives the intermediate shaft 17 and also through the stator S, which is held against reverse rotation by the one-way brake 18 mounted on a ground sleeve 19, suitably secured to the fixed transmission housing 20. The lockup clutch 21 has a fixed plate 22 secured to the housing 11 and a driven plate 23 secured to the hub 16. The clutch is applied by a fluid motor including a piston 24 secured to the housing 11 and a cylinder 26 rotatably fixed and axially movable therein to engage the clutch on the supply of fluid by the lockup clutch supply line 27.

The low planetary gear set has a ring gear 31 and a sun gear 32 meshing with planetary pinions 33 mounted on a carrier 34 connected to the output or driven shaft 36. Intermediate shaft 17 drives the sun gear 32 and when the ring gear 31 is held stationary by the low reaction brake 37, low forward drive is provided. The brake is engaged when fluid is supplied via the low ratio apply line 38 to the cylinder 39 to move the piston 41 to engage brake 37 to connect the ring gear to the stationary housing 20.

The intermediate ratio gear set has a ring gear 43 and a sun gear 44 meshing with planetary pinions 46 mounted on a carrier 47 which is connected to the ring gear 31. Intermediate ratio is provided when the intermediate brake 50 is engaged to retard the ring gear 43. Fluid supplied by the low ratio line 48 to the cylinder 49 moves the piston 51 to engage intermediate brake 50.

The high clutch 53 has one hub 54 connected to carrier 47 and a second hub 56 driven by the intermediate shaft 17 and carrying the cylinder 57 and piston 58 to rotate with the cylinder. On the supply of fluid by the high ratio apply line 59 to the cylinder 57, the piston is axially moved to engage the high clutch to drive the carrier 47 and the sun gear 44 at the same speed to lock up the gear unit for high or direct drive. The hub 56 may have a power take-off gear 61 and carries a rotating can 62 which is maintained suitably filled with fluid which impinges on the opened end of the pitot tube 63 to provide in front governor line 65 a fluid pressure proportional to intermediate shaft speed.

The reverse gear unit has a ring gear 66 and a sun gear 67 meshing with planetary pinions 68 mounted on a carrier 69 connected to drive the output shaft 36. Sun gear 67 is connected by the sleeve shaft and hub 71 to the ring gear 31. When fluid is supplied by the reverse ratio apply line 72 to the cylinder 73 to actuate piston 74 to engage the reverse brake 75 to hold ring gear 66, reverse ratio is provided.

The rear governor 76 has a similar can or annular trough rotating on the output shaft 36 to cause the fluid to impinge on the pitot tube supplying pressure to rear governor line 77 to provide a pressure proportional to output shaft speed. The ratio brake and clutch motors for engaging each ratio have suitable retraction springs. The motor pistons are restrained against rotation with respect to the cylinders. Only one fluid motor is engaged to provide each ratio. The lockup clutch may have retraction springs and/or be disengaged by torque converter chamber pressure.

Hydraulic controls.—Trimmer valves

Trimmer valve 81 has a valve plug 82 and a hollow valve element 83 with a spring therebetween located in the hollow portion of valve element 83 located in a bore 84. A spring assembly 86 engaging the abutment wall 87 constantly urges the valve plug and element toward the control end of the valve. Fluid is supplied from the main line 91 via orifice 92 to the spring chamber and bore 84. The pressure in the spring chamber is regulated by the regulator valve 94 at a value varying with the throttle pressure. The regulator valve 94 has a valve element 96 closing a port 97 in the wall 87 under the biasing force of spring 98 seated on an abutment piston 99 movably mounted in a bore 101. TV pressure supplied via line 177 acts on the piston 99 against the bias of spring 100 seated on wall 87 to vary the biasing force of spring 98 and thus pressure in the spring chamber, in accordance with throttle pressure.

Fluid in the range main line 103 will, when the flow valve 161 shifts during a ratio change and exhaust line 104 to exhaust 159, act on the end of valve element 83, move the valve element and plug 82 against the biasing force of spring assembly 86 and the pressure in the spring chamber controlled by valve 94 to regulate range main pressure at a low value by exhausting the excess fluid to exhaust 106. It will be noted that this initial low regulated pressure increases with throttle pressure. When the fluid is being regulated, the regulated pressure passes through the orifice 107 to balance the pressure on opposite sides of the valve element 83 and to permit the spring 108 to gradually separate the valve plug and valve element at a rate controlled by the size of orifice 107 to provide a gradually increasing regulated pressure. Spring 86a may be weaker than spring 86b so there is a slow rate of pressure rise until abutment member 109 engages wall 87 controlled by the weaker spring 86a and thereafter a faster rate of pressure rise controlled by the stronger spring 86b. When the valve plug 82 abuts the floating abutment member 109 and it is in contact with the wall 87, movement of plug 82 is stopped and the spring 108 moves element 83 to close exhaust 106, terminating pressure regulation at a normal line pressure value. Also, on engagement of a ratio, the main line pressure supplied via the branch 141, flow valve 161 and line 104 will close the regulator valve 94 and block the main line pressure supplied from line 91 and orifice 92 in the spring chamber and reset the valve to the position shown for the initiation of another regulation cycle on any shift.

Pumps.—Regulator valve

All fluid from the lubrication system and exhaust is returned to the sump 111 and supplied by front pump 14 directly to the main line 91 and by rear pump 112 to the rear pump line 113 which has a rear pitot orifice feed 114 and is connected in parallel by the restricted line 116 and the one-way check valve line 117 to the main line 91.

The main line 91 is regulated by the main pressure regulator valve 121 having a valve element 122 having land a of large diameter located in large bore 123 and land b and c of smaller diameter located in a smaller bore 124. The front governor plug 126 in a smaller bore 127 acts through the integral high ratio plug 128 located in bore 124 and the two plug element acts in a pressure decreasing direction on the valve element 122. The biasing spring assembly 131 and the throttle plug 132 located in bore 133 with exhaust 133' act on the valve element 122 in a pressure increasing direction. Main line 91 is connected at port 134 between the unbalanced lands a and b to bias the valve in a pressure decreasing or exhaust direction.

As flow increases the main line is connected past land b to supply the excess overage fluid to the converter feed line 138 and then past land a to exhaust 139. Converter feed line has a relief valve 138' to prevent excessive pressure due to excess overage during cold starts, high speed converter operation and lockup operation. Lockup clutch feed pressure in line 141 is connected via orifice 142 to act on the land c to decrease main line pressure when the lockup clutch is engaged. High ratio pressure in line 59 acts on the high ratio plug 128 to decrease main line pressure when the lockup clutch is not engaged. Front governor pressure in line 64 is connected via damping orifice 143 to act on the governor plug 126 to decrease main line pressure proportional to intermediate shaft speed. Throttle pressure from line 177 via orifice 144 is connected to bore 133 to actuate plug 132 to increase main line pressure proportional to throttle pressure.

Flow valve

The flow valve 151 has a valve element 152 having lands a and b of equal diameter in a bore 153 and a land c of larger diameter in a large diameter bore 154. Main line 91 is connected to the bore 153 to act on the free end of land a and via the orifice 156 to the range main line 103 which is connected by branch 157 to act on the free end of land c. When there is no flow from the main line to the range main line, the pressures on opposite ends of valve element 152 are equal and pressure on larger land c holds the valve in the position shown. When there is flow, the pressure drop at orifice 156 reduces the pressure in range main line 103 and the pressure acting on the larger land c sufficiently to cause the valve 152 to shift from the position shown to the lockup cutoff position. In the lockup position shown, lockup feed line 141 is connected between lands a and b to lockup line 104. In the cutoff position, lockup feed line 141 is blocked and lockup line 104 is connected to exhaust 159. Valve 152 is moved sufficiently to connect main line 91 via the bore 153 to main range line 103 to prevent an excessive pressure drop across restriction 156. When flow ceases and the range line 103 has pressure equal to main line 91, the range pressure acting on the larger land c returns the valve to the lockup position shown.

Lockup shift valve

A lockup shift valve 161 has a valve element 162 having lands a, b and c and d located in a bore 163. The spring 164 biases the valve element to the downshift position shown and front governor pressure via line 64 acts on the governor plug 166 located in the bore 167 to urge the valve in the opposite direction to an upshift position. In the downshift position shown, the converter feed line 138 is connected through restriction 172 and the valve bore between the lands a and b to the converter feed line 168. Main line branch 169 is blocked by the land b and lockup feed line 141 is connected to exhaust 174. On an upshift, when governor pressure overcomes the biasing force, the connection via bore 163 of feed line 138 to converter line 168 is blocked by the land b and a limited supply through restriction 172 is provided. Main line branch 169 is connected to the lockup feed line 141. Exhaust 176 vents the bore between the valve element and plug 166. Downshift is provided when fluid is supplied by the downshift line 262 to the spring chamber to act on the upper end of the valve element 162. The fluid flows via line 168, through the converter operating chamber to the converter outlet line 178 having a flow restricting orifice 178', a cooler 179. The cooler outlet is connected to pitot governor feed line 179', lubrication feed 180 and regulated by regulator valve 180'.

Intermediate high shift valve

The intermediate high shift valve 181 has a valve element 182 having lands a, b, c and d located in a bore 183. The valve is normally held in the downshift position by a spring 186 and also when range 1–2 pressure supplied via line 187 acts on the plug 188 located in bore 189 which acts through the integral stem 191 to urge the valve 182 in a downshift direction. Rear governor pressure connected via branch 192 will at a speed for the normal zero or very light throttle shift move the plug 188 away from the valve 182 for an upshift. At higher throttle positions movement of plug 188 will condition valve 182 for rateless governor throttle shifting. Throttle pressure via line 193 is connected to the bore 183 when the shift valve is in a downshift position to bias the valve in the downshift direction. Detent pressure via line 177 is always connected to act on the valve to move it in the downshift direction. The rear governor pressure via branch 194 is connected to act on plug 196 located in bore 197 to move the shift valve in an upshift direction. Thus the position of the shift valve is controlled by force signals proportional to conditions of transmission operation, governor and throttle pressure.

In the downshift position shown, the intermediate high shift valve connects the branch 201 of intermediate high feed line 202 to the intermediate ratio line 48 and blocks the branch 203 from exhaust at the shift valve. The high ratio line 59 is always connected to branch 59' which passes through shutoff valve 210 and check valve 211 to the front governor line 64 between the orifice 212 and the lockup valve to upshift the lockup shift valve and engage the lockup clutch at all times in high ratio. If this operation is not desired, shutoff valve 210 is closed and lockup is speed responsive in intermediate and high ratios. The high ratio line 59 is connected to exhaust 204. Exhaust 206 vents the space between the valve and governor plug 196. When the rear governor pressure acting on governor plug 196 overcomes the throttle pressure, the valve 182 upshifts to connect intermediate ratio line 48 to exhaust 208, connect the intermediate high feed branch 201 to the high ratio line 59 and block exhaust 204. Land $b$ blocks branch 203 and the hysteresis space between lands $a$ and $b$ is vented by exhaust 207.

Since the land $c$ is larger than the land $b$ and land $b$ is larger than land $a$ and the bore is accordingly stepped, there are two unbalanced or hysteresis forces, one on land $b$ and one on land $c$, in the downshift direction tending to hold the shift valve in the downshift position. When the upshift is initiated, the pressure between the lands $a$ and $b$ is first promptly exhausted so that there is a snap action movement by dropping the force on land $b$ during the first or initial increment of shift movement and then in the second or terminal increment of shift movement the force on land $c$ is dropped. On downshift, in the first or initial increment of movement, the force on land $c$ is reinstated for downshift hysteresis and then in the second or terminal increment of movement the force on land $b$ is reinstated. Thus a hysteresis force equal to half the total hysteresis force is applied by this hysteresis means immediately on initiation of both upshift and downshift movement of the shift valve preventing any partial movement or vibrating movement.

It will be noted that on an upshift the pressure between lands $a$ and $b$ is vented to first remove this hysteresis force by simultaneously cutting off the supply of fluid to this space and venting this small space at exhaust 207. Thus there is no flow through this space which might provide a Bernoulli effect counter to the dropping of the hysteresis force. Thereafter, when line 201 is blocked from line 48 and exhaust 208 is open and intermediate apply pressure has time to be reduced, the other hysteresis force is dropped and there is no flow between these lands and thus no Bernouili effect. Flow from line 201 to line 59 past the underside of land $c$ would have a Bernoulli effect but the land is recessed to prevent this as taught in application Ser. No. 237,037 by Robert H. Schaefer, now Patent 3,181,386, assigned to applicant's assignee.

On a downshift, when the force is first established on land $c$, there is flow between land $b$ and $c$, but due to the small size of the intermediate motor this need not be corrected for hysteresis interference but may be corrected as taught in Ser. No. 237,037. Though there is flow between lands $a$ and $b$, the Bernoulli effect on the lands providing the second hysteresis effect, this is not important since the first hysteresis force is controlling.

Low intermediate shift valve

The low intermediate shift valve 216 has a valve element 217 having lands $a$, $b$, $c$ and $d$ located in a bore 218. The rear governor pressure via branch 219 acts on the plug 221 in bore 222 to urge the valve element 217 in an upshift direction. The blocker plug 223 is normally biased by spring 224 and range 1 pressure supplied by line 226 acting through integral strut 228 to hold the valve in the downshift position.

When the output speed is proper for a zero or very light throttle upshift, the rear governor pressure supplied via line 77 acts on the plug 223 to move it against the biasing forces to shift the valve 217 at very light throttle or to free the valve for rateless shifting due to the opposing governor and normal throttle forces. In the downshift position shown, the branch 231 of the drive range or range 1–2–3 line 232 is connected between lands $b$ and $c$ to the low ratio line 38 and the intermediate high supply line 202 is connected between lands $c$ and $d$ to restricted exhaust 233. When the low intermediate shift valve 217 is upshifted by governor pressure acting on governor plug 221 or the range 2–3 signal pressure in line 234 acting directly on the valve, the branch 231 is connected to the intermediate high supply line and the low ratio line 38 is connected to exhaust 236.

The low intermediate shift valve is provided with the same type of hysteresis action as the intermediate high shift valve. On the low intermediate valve the land $c$ is larger than land $b$ and land $b$ is larger than land $a$. The range 1–2–3 pressure supplied by branch 230 acts on land $b$ and supply by branch 231 acts on land $c$ in a downshift direction. In the initial increment of an upshift the force on land $b$ is dropped as exhaust 237 first opens, then in the terminal increment of the shift movement exhaust 236 opens and the force on land $c$ is dropped. On a downshift the forces are picked up in reverse order.

Inhibitor valves

The range 1–2–3 line 187 has a restriction 241, and between the restriction and the intermediate high shift valve, a relief valve 242 to limit the pressure supplied to the intermediate high shift valve so that at excessive speeds in the 1–2 ratio range the governor pressure in branch 192 will move the blocker plug 188 to permit shifting of the intermediate high shift valve. The range 1 line 226 also has a restriction 243, a relief valve 244 to similarly limit the pressure in the range 1 line and prevent holding the transmission in first ratio and provides an automatic upshift at excessive speeds.

Manual valve

The manual valve 246 has a valve element 247 having lands $a$ and $b$ located in a bore 248 opened at both ends. Range main line 103 is connected to the bore between the lands in all valve positions. In reverse position, fluid is supplied to reverse line 72 and range 2–3 signal line 234. In neutral position fluid is supplied only to line 234. In the range 2–3 position, fluid is supplied to signal line 234 and drive range 232. In the range 1–2–3 position, fluid is supplied only to the drive range line 232. In the range 1–2 position, fluid is supplied to the drive range line 232 and range 1–2 line 187. In range 1 position, fluid is supplied to drive range line 232, the range 1–2 line 187 and the range 1 line 243.

The front governor pressure in line 64 is exhausted by check valve 245 when there is no pressure in range main line 103 in forward drive ranges and is exhausted to zero or a very low pressure value in neutral and reverse when line 232 is connected to exhaust. Thus the lockup clutch cannot be engaged in neutral or reverse.

Thottle valve

The throttle valve 251 has a regulator valve element 252 having lands $a$ and $b$ located in a bore 253 and a detent valve element 254 in the same bore with the spring 256 between these valve elements. Main line pressure is connected by line 91 between the lands of the regulator valve 252 to the branch 255 of the throttle line 177. The throttle pressure via branch 257 acts on the unbalanced area of land $a$ urging valve 252 against the spring 256 to connect throttle pressure to exhaust 258. The biasing force of spring 256 is controlled by movement of the detent valve 254 by the throttle pedal to provide increasing biasing force and thus increasing throttle pressure with increasing throttle position. Exhaust 259 vents the spring chamber. At about half, preferably five-eighths throttle, the throttle pressure branch line 261 is connected by the space between the lands of this valve to the detent pressure line 262. Restricted exhaust 263 permits exhaust of line 261 only when the supply from line 261 is blocked. Since the throttle and detent pressure lines are interconnected at the intermediate high shift valve in the lower, first and second ratios, throttle and detent downshifts are provided at all throttle positions. In high, since only the detent line is connected to the shift valves, forced downshifts occur only above five-eighths throttle.

Operation

When the engine is idling, the front pump 14 supplies fluid to the main line 91 which is regulated by the main line regulator valve 121 at a pressure increasing with increasing throttle pressure and decreasing with increasing intermediate shaft speed. The main line pressure is also reduced when the high ratio is engaged. The first overage from the main line is connected to the converter feed line 138 and with the vehicle at rest or low speeds is connected through the lockup shift valve 161 and restriction 172 to the converter inlet line 168 to supply fluid to the operating chamber of the torque converter. At idle speeds the torque converter will slip and thus the transmission may be in neutral providing a positive neutral or any drive range position providing the lowest ratio available when the vehicle is standing or the proper ratio for the vehicle speed.

For normal driving, the manual valve 246 is shifted to the range 1-2-3 position for fully automatic shifting. Fluid is supplied from main line 91 through restriction 156 to the range main line 103 which is connected by the manual valve in range 1-2-3 position to the drive range line 232 only. The pressure in line 232 closes the valve 245 permitting build-up of front governor pressure in line 64 and also supplies pressure via line 232 to the low intermediate shift valve 216 which connects the pressure to the low apply line 38 engaging low ratio. As the throttle is advanced, the throttle pressure in line 177 increases in proportion thereto and the increased engine speed acting through the torque converter drives the vehicle at increasing speeds. At zero or light throttle pressures the rear governor pressure supplied by line 77 will lift plug 223 and the rear governor pressure via line 219 will lift plug 221 to upshift the low intermediate shift valve 216. At higher throttle pressures the rear governor pressure will lift plug 223 to condition the valve for a rateless shift. The throttle pressure will then be sufficient to hold the valve in the downshift position until a higher speed at which governor pressure supplied by line 219 will upshift the valve against only the throttle force and the two hysteresis forces. The one hysteresis force will be dropped immediately as the valve starts to move and the other will be dropped as the valve movement terminates to prevent vibration of the valve. In the upshifted position, the valve connects the low supply line to exhaust 236 and range 1-2-3 line to the intermediate high supply line 202.

The intermediate high line is normally connected by the intermediate high shift valve 181 in the downshift position shown to the intermediate supply line 40 and engages intermediate ratio. The intermediate high shift valve at the proper speed and throttle position will shift in the same manner as the low intermediate shift valve and connect the intermediate high supply line 202 to the high supply line 59 to engage at high ratio.

As a proper intermediate speed in first ratio drive, the lockup shift valve 161 will be upshifted by governor pressure to connect main line 91 to the lockup feed line 141 which is then connected by the lockup cutoff or flow valve 151 to the lockup supply line 27 to engage the lockup clutch. During the low to intermediate shift described above, flow from the main line 91 through orifice 156 to the range main line 103 to fill the intermediate ratio motor moves the flow valve 151 as explained above to block the lockup feed line 141 and connect the lockup supply line 27 to exhaust 159 and disengage the lockup clutch. As soon as the intermediate ratio is engaged flow ceases and the low valve returns to the normal position shown, re-engaging the lockup clutch. If it is desired to engage the lockup clutch at all speeds in high ratio, the high ratio pressure in high supply line 59 and branch line 59' may be connected via shutoff valve 210 and check valve 211 to a portion of the governor line 64 between restriction 212 and the lockup shift valve to hold the lockup shift valve upshifted whenever the transmission is in intermediate or high ratio. Continuous lockup in intermediate and high could be provided if line 203, instead of line 59, is connected to line 59'.

The manual valve may also be shifted to range 2-3 providing only intermediate and high ratios and in this position supplies range 1-2-3 pressure to line 232 and range 2-3 pressure to line 234 which holds the low intermediate ratio shift valve in intermediate position providing intermediate ratio as in range 1-2-3. The transmission then may upshift from intermediate to high ratio as in range 1-2-3.

On a shift from range 1-2-3 to range 1-2, fluid is supplied by the manual valve to range 1-2-3 line 232 and range 1-2 line 187. The pressure in line 187 holds or downshifts the intermediate high shift valve to provide intermediate ratio at normal speeds. At excessive speeds, since the pressure in line 187 is regulated by valve 242, this downshift will not occur and during operation in this range an automatic upshift will occur at excessive or dangerous speeds.

On movement of the manual valve to the range 1 position the manual valve continues to supply fluid to the line 232 and the line 187 as in range 1-2 and also supplies fluid to the range 1 line 227 which is similarly regulated by the pressure regulator valve 244 and is connected to the spring chamber of the low intermediate shift valve 216. Thus, if the vehicle is not traveling at excessive speeds for first ratio, the low intermediate shift valve will be downshifted and the transmission held in low ratio. It will be seen that if the speeds become excessive the transmission will shift from low to intermediate ratio by upshift of the low intermediate shift valve and then from intermediate to high ratio on a further increase to a speed excessive for second ratio and thus upshift the transmission to high ratio.

In reverse position, the manual valve supplies fluid to the reverse supply line 72 to engage reverse drive. Though fluid is supplied to the range 2-3 line 234 and the low intermediate shift valve will be upshifted, this has no effect on the operation since fluid is not supplied to the range 1-2-3 line 232. Since pressure is not supplied to line 232' the governor pressure is exhausted via valve 246 in the manual valve and there will be no lockup of the lockup clutch.

The above specific embodiment of the invention is illustrative of the invention and may be modified within the scope of the appended claims.

We claim:

1. In a transmission, fluid operated drive means operative to provide a transmission drive, a source of fluid under pressure, shift valve means connected to said source and said drive means and operative in a first position for disconnecting said source from said drive means and venting said drive means and in a second position for connecting said source to said drive means to control said drive means, control means providing an upshift and downshift force varying with a condition of transmission operation for moving said shift valve means to and from said first and second positions, and said shift valve means also having hysteresis means actuated by fluid under pressure controlled by said shift valve means operative immediately on initial movement of said shift valve means from each said position to immediately change the hysteresis force to assist movement of said shift valve means by said control means to the other position.

2. The invention defined in claim 1 and said drive means being operative on the supply of fluid to engage said drive, said shift valve means being operative in the first position to disengage said drive and in the second position to engage said drive and said hysteresis means resisting movement from said first to said second position and being reduced on the initial increment of movement from said first position toward said second position and being re-established on the initial increment of movement from said second position toward said first position.

3. In a transmission, first and second fluid operated drive means operative on the supply of fluid thereto to engage respectively a first and second drive, a source of fluid under pressure, shift valve means operative in a first position to connect said source to said first drive means and said second drive means to exhaust to engage said first drive and disengage said second drive and in a second position to connect said source to said second drive and said first drive to exhaust to engage said second drive and disengage said first drive, control means to move said shift valve means between said first and second positions, and said shift valve means including hysteresis means actuated by fluid pressure providing two forces on said shift valve controlled by said shift valve and operative during movement between said first and second positions to change said two forces to assist movement between said first and said second positions and operative in an initial increment of said upshift movement to abruptly change one force and in a terminal increment of said upshift movement to change the other force and operative on downshift movement from said second position to said first position to change said other force in an initial increment of said downshift movement and to abruptly change said one force in a terminal increment of said downshift movement.

4. In a transmission, first and second fluid operated drive means operative on the supply of fluid thereto to engage respectively a first and second drive, a source of fluid under pressure, shift valve means operative in a first position to connect said source to said first drive means and said second drive means to exhaust to engage said first drive and disengage said second drive and in a second position to connect said source to said second drive means and said first drive means to exhaust to engage said second drive and disengage said first drive, control means to move said shift valve means between said first and second positions, and said shift valve means including hysteresis means actuated by fluid pressure controlled by said shift valve operative in said first position to provide two forces resisting upshift movement from said first to said second position and operative in an initial increment of said upshift movement to disable one force and in a terminal increment of said upshift movement to disable the other force and operative on downshift movement from said second position to said first position to provide said other force in an initial increment of said downshift movement and to provide said one force in a terminal increment of said downshift movement.

5. The invention defined in claim 4 and said hysteresis means including two unbalanced chambers both connected to said source in said first position of said shift valve.

6. The invention defined in claim 4 and said shift valve means including a valve element in a bore, the valve element having three lands of progressively increased area providing two unbalanced chambers and the source being connected to both of said chambers in the first position of the shift valve and disconnected from the chambers and the chambers exhausted in the second valve position.

7. In a transmission, a drive train including a plurality of fluid actuated drive engaging devices, a source of fluid under pressure at least at a predetermined value, a governor providing governor pressure increasing with drive train speed to a value at least at said predetermined value, a first shift valve connected to said source and one fluid operated drive engaging device and operative to control the supply of fluid from said source to said one device to control operation of said one device and having fluid actuating means responsive to said predetermined pressure value to upshift said first shift valve, means connecting said governor pressure to said actuating means, second shift valve means movable to a plurality of positions to selectively connect said source to other of said devices to selectively provide a plurality of drives and being operative in one position to connect said source to said actuating means to positively upshift and hold said first shift valve in upshift position.

8. In a transmission, a drive train including a fluid drive having a fluid operated lockup clutch for the fluid drive, a multiratio fluid actuated gear unit having a plurality of fluid actuated ratio devices, a source of fluid under pressure, a governor providing governor pressure increasing with drive train speed, a lockup shift valve connected to said source and said lockup clutch and operative to control the supply of fluid from said source to said lockup clutch to control operation of the lockup clutch having fluid actuating means connected to said governor and responsive to said governor pressure to shift said lockup shift valve to engage said lockup clutch at a predetermined drive train speed, ratio shift valve means movable to a plurality of ratio positions to selectively connect said source to said ratio devices to selectively provide a plurality of ratios and being operative in one ratio position to connect said source to said actuating means to positively upshift said lockup shift valve to engage said lockup clutch and operative in another ratio position to permit said governor pressure responsive upshifting and downshifting of said lockup shift valve.

9. The invention defined in claim 8 and a governor passage having a restriction connecting said governor to said actuating means, a control passage connected to said governor passage between said restriction and said actuating means having a check valve permitting flow only to said governor passage and said ratio shift valve means in said one ratio position connecting said source to said control passage for supply through said check valve to said governor passage.

10. In a transmission, a drive train including a fluid drive having a fluid operated lockup clutch for the fluid drive, a multiratio fluid actuated gear having a plurality of fluid actuated ratio devices, a source of fluid under pressure, a throttle control movable to a plurality of positions, a lockup shift valve connected to said source and said lockup clutch and operative to control the supply of fluid from said source to said lockup clutch to engage the lockup clutch, ratio shift valve means movable to a plurality of ratio positions to selectively connect said source to said ratio devices to selectively provide a plurality of ratio drives, ratio change means responsive to a change in ratio by said ratio shift valve means to disengage said lockup clutch, regulator valve means connected to said source, said ratio shift valve means and said ratio change means operative when the lockup clutch is engaged and disengaged in response to each change of ratio to control the pressure of said source to provide an initial reduced pressure proportional to throttle control movement and to gradually increase the pressure to the pressure value of said source during ratio engagement.

11. In a transmission, fluid operated drive means operative to provide a transmission drive, a source of fluid under a regulated pressure, a shift valve means having connecting port means for selectively connecting said source and said drive means and operative in a first position for disconnecting said source from said drive means and venting said drive means and in a second position for connecting said source to said drive means to control said drive means, control means providing a force varying with a condition of transmission operation acting on said shift valve means for moving said shift valve means between said first and second positions in accordance with a condition of transmission operation, and said shift valve means including additional hysteresis means selectively connected to said source and actuated by fluid under said regulated pressure of said source and controlled by the position of said shift valve means operative immediately on initial movement of said shift valve means from each of said positions to change the hysteresis force to assist movement of said shift valve means by said control means to the other position.

12. The invention defined in claim 11 and said hysteresis means including two unbalanced areas on said shift valve means each located in a small chamber which is closed when connected to said source and vented when disconnected from said source.

13. The invention defined in claim 12 and said hysteresis means being operative immediately during initial movement of said shift valve means from the first to the second position and from the second to the first position to change the hysteresis force to assist movement of said shift valve means in both directions and to further assist movement during terminal movement.

14. In a transmission; fluid operated drive means operative to provide a transmission drive; a source of fluid under a regulated pressure; shift valve means connected to said source and said drive means and operative in a first position for disconnecting said source from said drive means and venting said drive means and operative during movement to a second position for connecting said source to said drive means to control said drive means; said shift valve means being operative on movement from each position to the other position to change the pressure supplied to said drive means to establish and disestablish said drive; control means providing a resultant force varying with conditions of transmission operation for moving said shift valve means between said first and second positions operative in both positions of said shift valve means; and said shift valve means having in addition to said control means, hysteresis means actuated by fluid under pressure controlled by said shift valve means operative during movement of said shift valve means from one position to change the hysteresis force to assist movement of said shift valve means to the other position prior to said change in pressure to establish and disestablish said drive and said resultant force of said control means being effective during said last-mentioned movement of said shift valve means.

15. In a transmission, a drive train including a first, second and third ratio drive establishing device, a source of fluid under pressure, a governor providing a pressure varying with drive train speed, a first shift valve having inlet and exhaust ports operative in a normal downshift position to provide connections to said second device for establishing said second drive and an upshift position to provide connections to said third device for establishing said third drive, a second shift valve connected to said source and having inlet and exhaust ports operative in a normal downshift position to provide connections to said first device to establish said first drive and an upshift position to provide connections to said first shift valve for establishing said second drive when said first shift valve is in said downshift position and said third drive when said first shift valve is in said upshift position, means connecting said governor pressure to said second shift valve for upshifting at a low speed and to said first shift valve for upshifting at a higher speed, manual control means operative in a first position to permit governor shifting of both shift valves, in a second position to hold both shift valves in the downshift position, in a third position to hold said second shift valve in an upshift position and permit governor shifting of said first shift valve and in a fourth position to hold said first shift valve in a downshift position and permit governor shifting of said second shift valve.

References Cited
UNITED STATES PATENTS

| | | | |
|---|---|---|---|
| 2,640,273 | 6/1953 | Jandesek | 74—645 |
| 2,667,085 | 1/1954 | Ackermann | 74—645 |
| 2,697,363 | 12/1954 | Sheppard | 74—472 |
| 2,707,887 | 5/1955 | Slack | 74—645 |
| 2,782,657 | 2/1957 | Lucia | 74—645 |
| 2,788,678 | 4/1957 | Sheppard | 74—645 |
| 2,815,684 | 12/1957 | Roche | 74—645 |
| 2,824,631 | 2/1958 | De Lorean | 192—3.2 |
| 2,849,889 | 9/1958 | Ball et al. | 74—472 |
| 2,903,910 | 9/1959 | Carnegie | 74—645 |
| 3,025,725 | 3/1962 | Roche | 74—754 |
| 3,053,116 | 9/1962 | Christenson et al. | 74—752 |
| 3,058,373 | 10/1962 | Snoy et al. | 74—732 |
| 3,083,588 | 4/1963 | Christenson | 74—472 |
| 3,096,666 | 7/1963 | Christenson et al. | 74—645 |
| 3,128,642 | 4/1964 | Fisher et al. | 74—752 |
| 3,174,362 | 3/1965 | Fisher et al. | 74—720.5 |

DONLEY J. STOCKING, *Primary Examiner.*

DAVID J. WILLIAMOWSKY, *Examiner.*

J. R. BENEFIEL, *Assistant Examiner.*